(12) United States Patent
Buenvenida

(10) Patent No.: US 11,697,510 B2
(45) Date of Patent: Jul. 11, 2023

(54) MONITORING HEALTH OF SAFETY BRAKES IN AUXILIARY LIFT DEVICES

(71) Applicant: The Boeing Company, Chicago, IL (US)

(72) Inventor: Krismarc Manguera Buenvenida, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 460 days.

(21) Appl. No.: 16/776,985

(22) Filed: Jan. 30, 2020

(65) Prior Publication Data
US 2021/0237906 A1 Aug. 5, 2021

(51) Int. Cl.
*B64F 5/60* (2017.01)
*B64D 43/00* (2006.01)
*B64D 45/00* (2006.01)
*F16D 59/00* (2006.01)

(52) U.S. Cl.
CPC ............... *B64F 5/60* (2017.01); *B64D 43/00* (2013.01); *B64D 45/00* (2013.01); *B64D 2045/0085* (2013.01); *F16D 59/00* (2013.01)

(58) Field of Classification Search
None
See application file for complete search history.

(56) References Cited

U.S. PATENT DOCUMENTS

| | | | |
|---|---|---|---|
| 6,824,099 B1* | 11/2004 | Jones | B64C 13/28 244/99.2 |
| 10,288,502 B1* | 5/2019 | Ankney | B64F 5/60 |
| 2004/0200677 A1 | 10/2004 | Mayer et al. | |
| 2009/0146015 A1* | 6/2009 | Schievelbusch | B64D 45/0005 244/213 |
| 2017/0352204 A1* | 12/2017 | Huet | G06N 5/04 |
| 2018/0208300 A1* | 7/2018 | Bill | B64F 5/60 |
| 2019/0063508 A1* | 2/2019 | Harrington | F16D 7/08 |
| 2020/0156766 A1* | 5/2020 | Tzabari | B64C 9/02 |
| 2020/0307775 A1* | 10/2020 | Tzabari | B64C 13/505 |
| 2020/0324872 A1* | 10/2020 | Trenkle | B64C 3/38 |
| 2021/0122457 A1* | 4/2021 | LeMaster | B64C 13/00 |

* cited by examiner

*Primary Examiner* — James J Lee
*Assistant Examiner* — Wenyuan Yang
(74) *Attorney, Agent, or Firm* — Quinn IP Law

(57) ABSTRACT

An aircraft system monitors health of passive safety brakes on a plurality of auxiliary lift wing devices of an aircraft wing. The wing includes an actuator driveline, and a plurality of actuators are secured to the driveline for extending and retracting the auxiliary lift wing devices. Each actuator incorporates a passive safety brake, and a flight computer enables the actuators to synchronously extend and retract the auxiliary lift wing devices. Torque sensors are fixed to the actuator driveline, each torque sensor being positioned adjacent an actuator for sensing static torque values at that actuator location. When an aerodynamic load acting on any one extended auxiliary lift wing device creates a higher static torque value at one actuator location relative to others, the aircraft system generates a warning signal and/or message to indicate occurrence of a potential safety brake failure within the one actuator.

20 Claims, 6 Drawing Sheets

MONITORING HEALTH OF SAFETY BRAKES IN AUXILIARY LIFT DEVICES

FIELD

The present disclosure relates generally to assessing conditions of brake components within auxiliary lift devices on aircraft, and more specifically to use of torque sensors for monitoring health of passive safety brakes of rotary actuators that extend and retract the auxiliary lift devices.

BACKGROUND

Commercial aircraft employ auxiliary lift devices to enhance flight control safety at relatively slower speeds, particularly during takeoffs and landings. Commonly utilized auxiliary lift devices are flaps, typically attached to trailing edges of aircraft wings, and slats, typically attached to leading edges of wings. Aerodynamic forces tend to act on extended auxiliary lift devices to urge such devices to retract. Thus, safety brakes are normally used to hold such devices in place while extended. Any unintentional retraction of such device is not an option, as a catastrophic blow-back of such device onto its associated wing structure, or even a possible detachment of the device from the aircraft, can occur from such retraction.

Two types of safety brakes are used for this purpose on commercial transport aircraft. One is an active brake, requiring constant monitoring and control by a flight computer. The second is a passive brake, requiring no commands from either the flight computer or pilot of the aircraft.

SUMMARY

In accordance with one example of the present disclosure, an aircraft system monitors health of passive safety brakes in auxiliary lift wing devices moveably attached to the wing. The wing includes an actuator driveline to which is secured a plurality of actuators for deploying the auxiliary lift wing devices. Each actuator includes a passive safety brake, and each actuator is moveably connected to at least one auxiliary lift wing device. A plurality of torque sensors are fixed to the actuator driveline, each torque sensor positioned adjacent one actuator and configured to sense torque values on the driveline at the one actuator. When an aerodynamic load acting on one extended auxiliary lift wing device creates a higher static torque value at one actuator compared with torque values at other actuators, a signal is generated to indicate a potential safety brake failure within the one actuator.

In accordance with another example of the present disclosure, an aircraft includes a system for monitoring health of passive safety brakes in a plurality of auxiliary lift aircraft wing devices moveably attached to a wing, the wing including an actuator driveline. A plurality of actuators are secured to the actuator driveline for deploying the auxiliary lift wing devices, each actuator including at least one passive safety brake, and each actuator moveably connected to at least one auxiliary lift wing device. A flight computer is configured to synchronously extend and retract the auxiliary lift wing devices via the plurality of actuators, and a plurality of torque sensors, each fixed to the actuator driveline adjacent one actuator, are configured to sense torque values on the driveline at each actuator. When an aerodynamic load acting on one extended auxiliary lift wing device creates a higher static torque value at one actuator relative to torque values at other actuators, a signal is generated by the flight computer to indicate a potential safety brake failure within the one actuator.

In accordance with yet another example of the present disclosure, a method of monitoring health of passive safety brakes in auxiliary lift aircraft wing devices includes steps of providing an aircraft wing with an actuator driveline and a plurality of auxiliary lift wing devices moveably attached to the wing. The method further includes securing a plurality of actuators to the actuator driveline for deploying the auxiliary lift wing devices, providing a passive safety brake within each actuator, and connecting each actuator to at least one auxiliary lift wing device. The method further includes providing a flight computer for synchronously extending and retracting the plurality of auxiliary lift wing devices via the plurality of actuators, and providing a plurality of torque sensors, each torque sensor fixed to the actuator driveline adjacent one actuator, and configuring each torque sensor to sense torque values on the driveline at each actuator. Finally, the method includes generating a signal via the flight computer to indicate a potential safety brake failure within at least one of the actuators when an aerodynamic load acting on one extended auxiliary lift wing device creates a higher static torque value at the one actuator relative to torque values at other actuators.

The features, functions, and advantages disclosed herein can be achieved independently in various examples, or may be combined in yet other examples, the details of which may be better appreciated with reference to the following description and drawings.

It should be understood that referenced drawings are not necessarily to scale, and that disclosed examples are illustrated only schematically. Aspects of the disclosed examples may be combined with or substituted by one another, and/or within various systems and environments that are neither shown nor described herein. As such, it should be understood that the following detailed description is only exemplary, and thus not intended to be limiting in application or use.

DETAILED DESCRIPTION

The following detailed description addresses both apparatus and methods for carrying out the disclosure. Actual scope of the disclosure is as defined in the appended claims.

Figure 1:
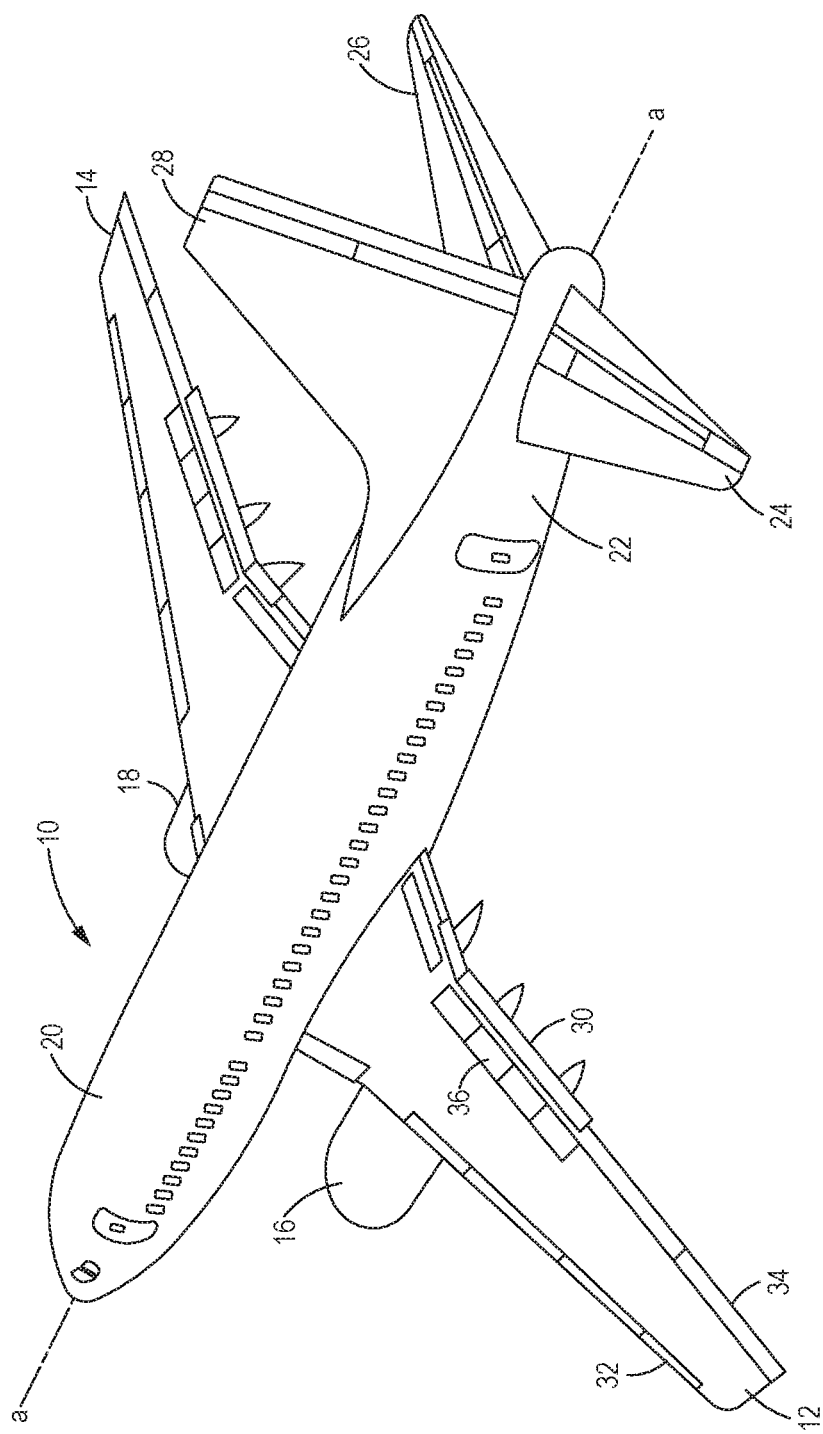
FIG. 1 is a perspective schematic view of an exemplary transport aircraft that may include an aircraft system for monitoring health of passive safety brakes in auxiliary lift wing devices, as may be constructed in accordance with the present disclosure.

Referring initially to FIG. 1, an aircraft 10, such as a commercial passenger transport aircraft, is shown, having a left wing 12 and a right wing 14, each extending laterally from a main body portion, or fuselage 20. A left engine 16 and a right engine 18 are supported from each of the left and right wings 12, 14, respectively. The aircraft 10 includes an empennage 22 that includes a left horizontal stabilizer 24, a right horizontal stabilizer 26, and a vertical stabilizer 28, all functional flight controls of the aircraft 10, as will be appreciated by those skilled in the art.

Continuing reference to FIG. 1, with reference to only the left wing 12 to avoid redundancy, flaps 30 are attached to a trailing edge of the wing 12, and slats 32 are attached to the leading edge of the wing 12, as shown. The latter elements, i.e. the flaps 30 and the slats 32, are auxiliary lift devices designed to enhance stability during slow flight, particularly during takeoffs and landings. Other flight controls on each wing include at least an aileron 34, which acts as a primary flight control to manage amount of roll about a longitudinal axis "a-a" of the aircraft 10 during turns, and at least one spoiler 36, selectively utilized to reduce lift during rapid descents from high altitudes.

Figure 2:
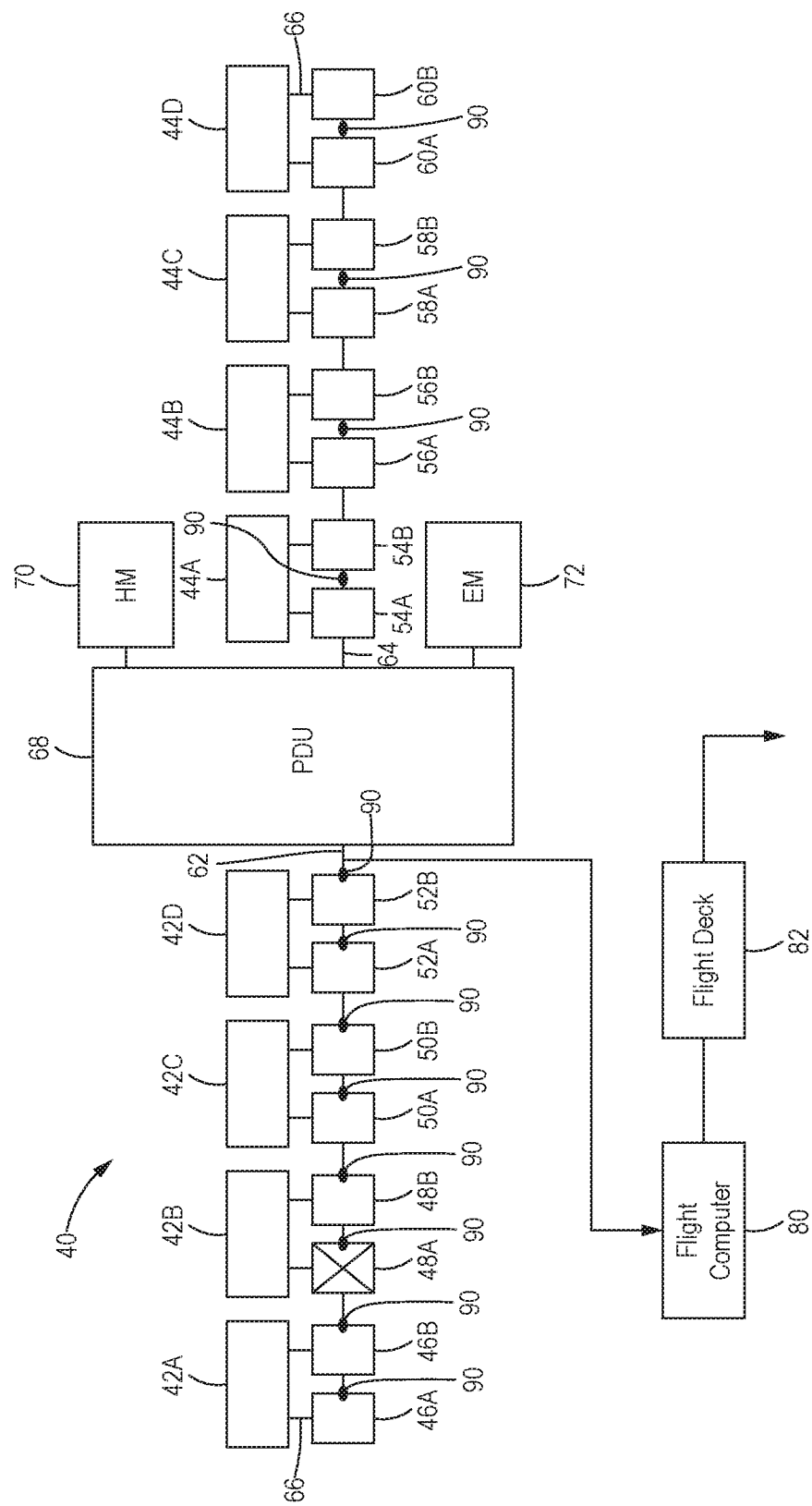
FIG. 2 is a schematic view of one example an aircraft system for monitoring health of passive safety brakes in auxiliary lift wing devices, as may be constructed in accordance with the present disclosure.

Referring to FIG. 2, an aircraft control system 40 is designed to manage deployment of the auxiliary lift devices; i.e., the above-described flaps 30 and slats 32. For brevity, only flap segments 42A through 42D and 44A through 44D of the left and right wings are herein described in reference to pairs of actuators 46A and 46B through 60A and 60B, all respectively secured to left and right wing flap actuator drivelines 62 and 64. Thus, in the schematic illustration of FIG. 2, there are depicted four flap segments on each wing, each controlled by one pair of actuators. Flap segments 42A, 42B, 42C and 42D are movably attached to the left wing, while flap segments 44A, 44B, 44C, and 44D are movably attached to the right wing. As such, each of the flap segments is redundantly controlled by a pair of actuators. For example, the pair of actuators 46A and 46B are configured to drive the flap segment 42A, while the pair of actuators 48A and 48B are configured to drive the flap segment 42B, and so on. Further, each actuator drives a flap segment via a control linkage 66, as displayed.

Continuing reference to FIG. 2, a power drive unit (PDU) 68, situated between the left and right wing flap actuator drivelines 62 and 64, is configured to drive the respective drivelines 62, 64. The PDU 68 is powered by redundant sources that include a hydraulic motor 70 and a backup electric motor 72. The PDU 68 is managed by a flight computer 80 in communication with a flight deck 82. The flight computer 80 is configured to synchronously extend and retract the entire plurality of auxiliary lift devices, i.e. the flap segments 42A, 42B, 42C and 42D movably attached to the left wing, and the flap segments 44A, 44B, 44C, and 44D movably attached to the right wing, via the described pairs of actuators 46A and 46B through 60A and 60B.

As also schematically displayed in FIG. 2, a plurality of torque sensors 90 is situated on each of the left and right wing flap actuator drivelines 62, 64. Each of the torque sensors 90 is ideally positioned adjacent one of the actuator pairs 46A and 46B through 60A and 60B, which are laterally spaced along both flap actuator drivelines 62, 64. Each torque sensor is juxtapositioned with and uniquely associated with at least one of the noted actuators, so that each torque sensor is enabled to sense torque values on the driveline at the one actuator. When an aerodynamic load acts on at least one extended flap, e.g. one of 42A-42D and/or 44A-44D, such load may create a higher static torque value in at least one actuator position, as compared with torque values at other actuator positions. In the described example, whenever such event occurs, a signal is generated by the flight computer 80 to indicate a potential safety failure within the one actuator.

The redundancy of actuators as provided for moving each flap offers an alternative strategy for driveline placement of the torque sensors 90. Thus, the right wing flap actuator driveline 64 schematically depicts an alternative placement of one torque sensor 90 shown fixed to the driveline 64 between each of the pairs of redundant flap actuators, such as between the actuator pairs MA and MB, and between the actuator pairs 56A and 56B, etc. This approach permits an economy in number of torque sensors required, thus using only half the number of torque sensors schematically depicted on the left wing flap actuator driveline 62, which calls for a torque sensor at each actuator. Of course, such alternative approach would involve an additional burden of having to check both actuators of each flap for any faults once a signal has been generated and recorded. Of course, unlike the split-view schematic of FIG. 2, only one of the two approaches would be prudently applied across both left and right wing flap actuator drivelines 62, 64 on any given aircraft.

Figure 3:
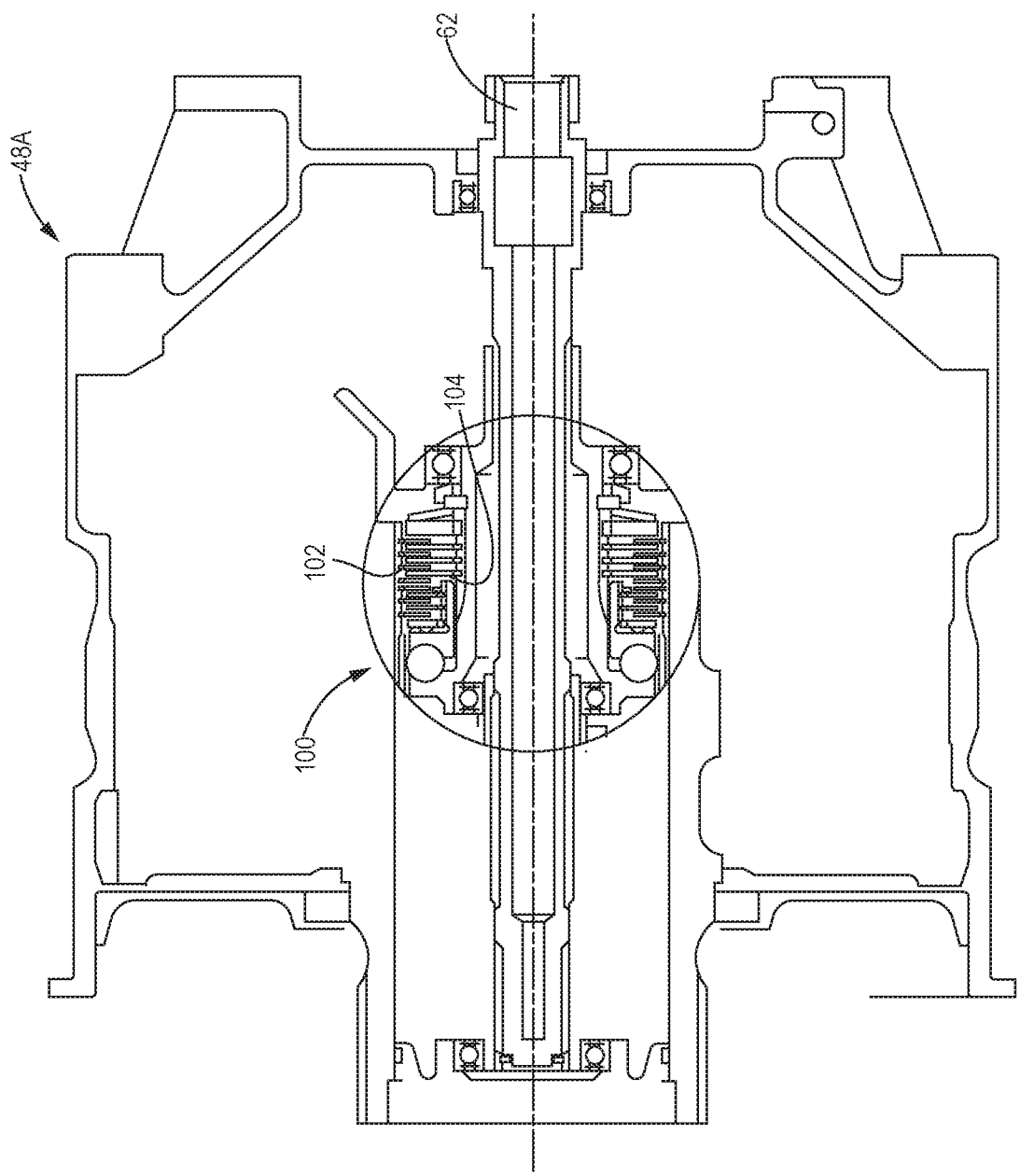
FIG. 3 is a cross-sectional view of one example of an actuator with various internal parts removed to highlight internal passive safety brakes, as may be constructed in accordance with the present disclosure.

Referring now to FIG. 3, an exemplary actuator, such as the actuator 48A of FIG. 2, is displayed in cross-section. The actuator 48A is shown secured in position on the left wing flap actuator driveline 62. Incorporated within the actuator, and common to all of the actuators 46A, 46B through 60A, 60B as herein disclosed, is a passive safety brake 100. The safety brake 100 consists of at least one set of interleaved brake discs 102, 104, although other types of brakes may be provided in the disclosed actuator example. Those skilled in the art will appreciate that the each disc 104 is splined to one of the flap actuator drivelines 62, 64, while each disc 102 is splined to a fixed portion of each actuator that does not rotate relative to either of the flap actuator drivelines 62, 64.

Figure 4:
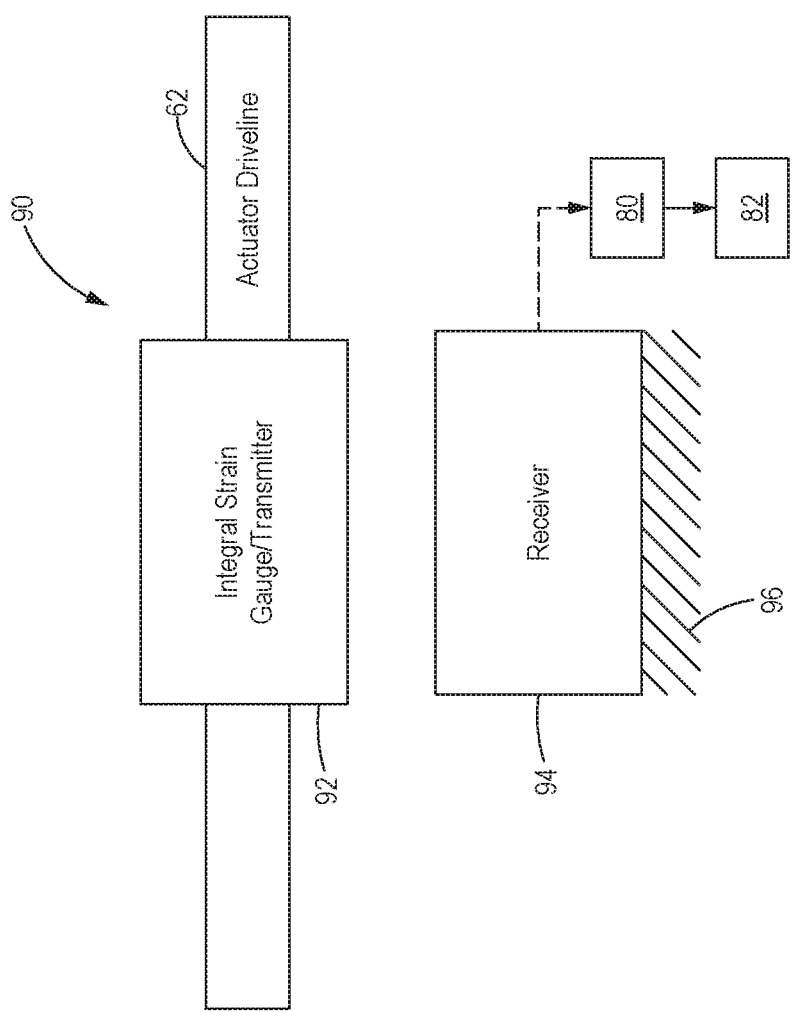
FIG. 4 is a schematic view of one example of a torque sensor that may be utilized in an aircraft system for monitoring health of passive safety brakes in auxiliary lift wing devices, as may be constructed in accordance with the present disclosure.

Referring to FIG. 4, one example of a torque sensor 90 includes an integral strain gauge and transmitter unit 92 secured to the flap actuator driveline 62. The transmitter unit interacts with a receiver 94 fixed to a stationary mount 96 positioned proximal to the actuator driveline 62. The receiver 94 communicates with the flight computer 80, which in turn communicates with the flight deck 82.

To summarize, referring back to FIG. 2, it will be appreciated that the torque sensors 90 are configured to sense torque values on both left and right flap actuator drivelines 62, 64. During flight, an aerodynamic load acts on at least one extended flap, e.g. one of 42A-D and/or 44A-D. If a passive safety brake 100 has failed, such aerodynamic load will create a higher static torque value at the actuator associated with the failed brake, as compared with such torque values measured at other actuator positions. In the described example, whenever such event occurs, a signal is generated by the flight computer 80 to indicate a potential safety failure within the at least one actuator, for example, of a safety brake component failure within the actuator 48A marked with an X.

In the context of this disclosure, "static" torque values are to be distinguished from "dynamic" torque values. A dynamic torque involves some aspect of acceleration; hence a dynamic torque is capable of producing rotation, and thus is capable of producing power. Conversely, a static torque involves only a reactive force; it does not produce power. By way of example, any measurement of an actuator driveline torque during an actual extension or retraction of an auxiliary lift device (flap or slat) is herein considered a dynamic torque measure, since such measurement would be taken during physical movement of the device, and would involve rotation of the actuator driveline. By contrast, all torque measurements utilized herein are for strictly static values, taken only when the devices are fixed in their extended states, and in which the drivelines 62, 64 are fixed; i.e. not rotating.

A method for in-flight monitoring of health of a plurality of passive safety brakes 100 in auxiliary lift aircraft wing devices 30, 32 may include steps of providing an aircraft wing 12, 14 with an actuator driveline 62, 64, and a plurality of auxiliary lift devices movably attached to the wing. The method may further include securing a plurality of actuators 46A-60B to the actuator driveline for deploying the auxiliary lift wing devices 30, 32, providing a passive safety brake 100 within each actuator, and connecting each actuator to at least one auxiliary lift wing device. The method may further include providing a flight computer 80 for synchronously extending and retracting the plurality of auxiliary lift wing devices via the plurality of actuators, and providing a plurality of torque sensors 90 fixed to the actuator driveline, each torque sensor positioned adjacent one actuator, and configuring each torque sensor to sense torque values on the driveline at each actuator location. Finally, the method may provide that when an aerodynamic load acts on one extended auxiliary lift wing device, a higher static torque value is created at one actuator relative to the other torque values, generating a caution signal by the flight computer to indicate a potential safety brake failure within the one actuator.

Figure 5:
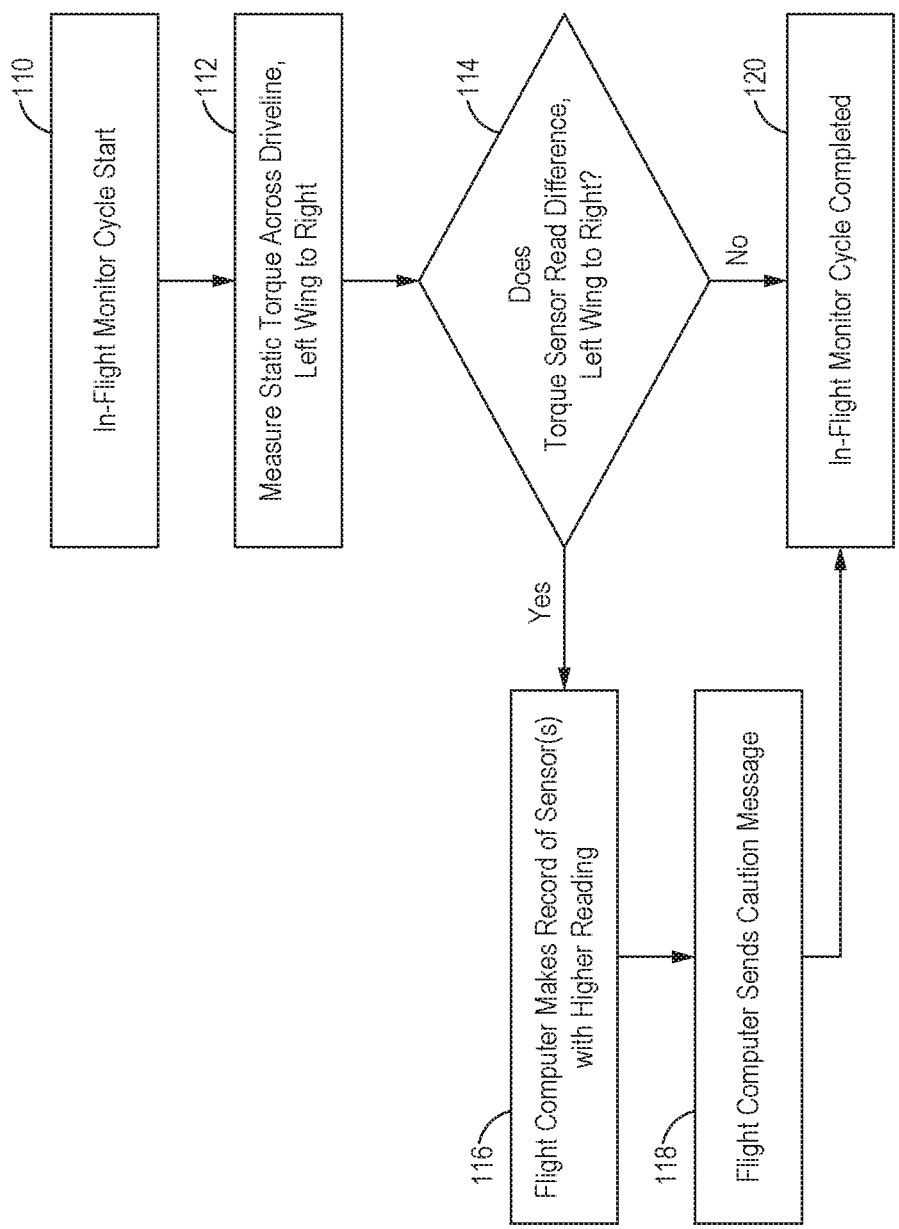
FIG. 5 is a flowchart of one in-flight computer monitor cycle that may be utilized in an aircraft system for monitoring health of passive safety brakes in auxiliary lift wing devices, as may be constructed in accordance with the present disclosure.

Referring now to FIG. 5, a flowchart displays an in-flight monitor cycle that measures static torque values across an actuator driveline. The static torque values are recorded by the flight computer 80, which then sends messages of events of torque sensor readings that indicate potential faults within any one of the described passive safety brakes 100. Thus, box 110 reflects initiation of one such in-flight monitor cycle. Box 112, in turn, indicates measurement by the flight computer 80 of static torque values across left and right wing flap actuator drivelines 62, 64, while box 114 indicates an inquiry/response regarding whether a particular static torque sensor value is registering higher than the static torque values of all other actuators. If yes, then the flight computer makes a record of the torque sensor value of the higher reading, per box 116, and sends a caution message to the flight deck 82, per box 118. The caution message may be in the form of a visual or audible alert. In other examples, the caution message may include a command to initiate mitigating action by the flight computer. If not, then box 120 indicates that the in-flight monitor cycle has been completed. Such completion, per box 120, is also recognized after the computer has sent a caution message, per box 118.

The flight control computer 80 may include capabilities for monitoring and recording high torque values over time. For example, if higher than normal readings are measured at any time during a particular flight, the flight control computer 80 would record sequences of snapshots of the abnormal readings. In the event the readings persist over several flight segments, servicing messages may be triggered. Via the torque value snapshots, a brake failure may be flagged based upon the consistently high readings, causing the flight control computer 80 to signal potential issues with either a particular service brake, the actuator associated with that particular service brake, and/or an associated torque sensor.

Figure 6:
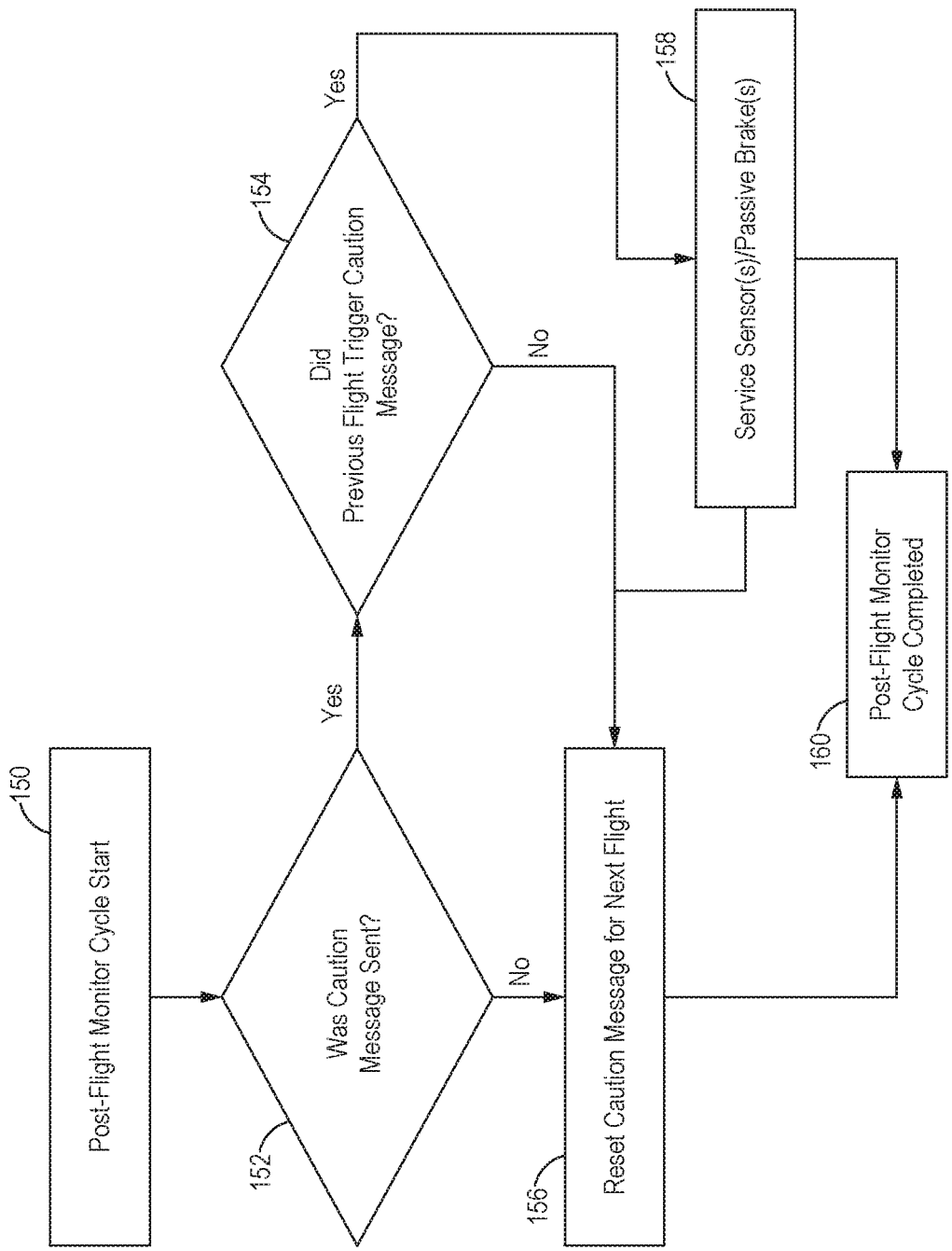
FIG. 6 is a flow chart of one post-flight computer monitor cycle that may be utilized in an aircraft system for monitoring health of passive safety brakes in auxiliary lift wing devices, as may be constructed in accordance with the present disclosure.

FIG. 6 displays a post-flight monitor cycle. Initiation of the post-flight cycle is indicated at box 150. Box 152 indicates an inquiry/response as to whether a caution message has been sent during the last flight and, if affirmative, a second inquiry box 154 queries as to whether the previous flight has triggered a caution message. If a response from either box 152 or 154 is negative, a caution message trigger is reset for the next flight. If the answer to the inquiry of box 154 is affirmative, then a notice to service the sensors and/or the passive brakes is provided, per box 158. Either the reset caution message of box 156 or the service notice of box 158 will complete the post-flight monitor cycle, per box 160.

Disclosures of the passive safety brake monitoring system presented herein may include other variations and alternatives neither described nor suggested. For example, components other than brakes, such as a failure of either of the described actuator drivelines 62, 64, may also be monitored via the described system. Although various specific structures, shapes, and components have been described and depicted, numerous other configurations and/or other components may be utilized, even potentially in other environments, as may be appreciated by those skilled in the art.

Clause 1. A system, comprising:

an aircraft wing having a plurality of auxiliary lift wing devices moveably attached to the wing, the aircraft wing further including an actuator driveline;

a plurality of actuators secured to the actuator driveline for deploying the auxiliary lift wing devices, each actuator including at least one passive safety brake, and each actuator moveably connected to at least one auxiliary lift wing device; and a plurality of torque sensors, each torque sensor fixed to the actuator driveline adjacent one actuator; each torque sensor configured to sense torque values on the actuator driveline at each actuator;

wherein when an aerodynamic load acting on one extended auxiliary lift wing device creates a higher static torque value at one actuator compared with torque values at other actuators, a signal is generated by the aircraft system to indicate a potential failure of at least one of the safety brakes.

Clause 2. The aircraft system of Clause 1, further comprising a flight computer that synchronously extends and retracts the plurality of auxiliary lift wing devices via the plurality of actuators.

Clause 3. The aircraft system of Clause 2, wherein when the signal is generated, the flight computer records the higher static torque value, and generates a message to indicate the potential failure of one of the safety brakes.

Clause 4. The aircraft system of Clause 2 or 3, wherein the flight computer synchronously controls left and right wing flap actuator drivelines via a power drive unit (PDU).

Clause 5. The aircraft system of Clause 4, wherein when an in-flight signal is generated, the flight computer also sends a message to a flight deck.

Clause 6. The aircraft system of Clause 5, wherein the signal also indicates a potential failure of one of the torque sensors.

Clause 7. The aircraft system of any of Clauses 4-6, wherein the PDU is powered by redundant power sources.

Clause 8. The aircraft system of Clause 7, wherein one of the redundant sources is a hydraulic motor.

Clause 9. The aircraft system of Clause 7, wherein one of the redundant sources is an electric motor.

Clause 10. An aircraft having a system for monitoring health of passive safety brakes in auxiliary lift aircraft wing devices, the aircraft comprising:
 an aircraft wing having a plurality of auxiliary lift wing devices moveably attached to the wing, the wing further including an actuator driveline;
 a plurality of actuators secured to the actuator driveline for deploying the auxiliary lift wing devices, each actuator including at least one passive safety brake, and each actuator moveably connected to at least one auxiliary lift wing device;
 a flight computer for synchronously extending and retracting the plurality of auxiliary lift wing devices via the plurality of actuators; and
 a plurality of torque sensors, each torque sensor fixed to the actuator driveline adjacent one actuator; each torque sensor configured to sense torque values on the actuator driveline at each actuator;
 wherein when an aerodynamic load acting on one extended auxiliary lift wing device creates a higher static torque value at one actuator relative to torque values at other actuators, a signal is generated by the flight computer to indicate a potential failure of at least one of the safety brakes.

Clause 11. The aircraft of Clause 10, wherein when the signal is generated, the flight computer records the higher static torque value at the one actuator relative to torque values at the other actuators, and triggers a message to indicate the potential failure of the at least one safety brake.

Clause 12. The aircraft of Clause 10 or 11, wherein the signal also indicates a potential failure of one of the torque sensors.

Clause 13. The aircraft of any of Clauses 10-12, wherein the flight computer controls left and right wing flap actuator drivelines synchronously via a power drive unit (PDU).

Clause 14. The aircraft of Clause 13, wherein the PDU is powered by redundant sources.

Clause 15. The aircraft of Clause 14, wherein one of the redundant sources is a hydraulic motor.

Clause 16. The aircraft of Clause 14, wherein one of the redundant sources is an electric motor.

Clause 17. A method of monitoring health of passive safety brakes in auxiliary lift aircraft wing devices, the method comprising steps of:
 providing an aircraft wing having an actuator driveline and a plurality of auxiliary lift wing devices moveably attached to the wing;
 securing a plurality of actuators to the actuator driveline for deploying the auxiliary lift wing devices, providing a passive safety brake within each actuator, and connecting each actuator to at least one auxiliary lift wing device;
 providing a flight computer for synchronously extending and retracting the plurality of auxiliary lift wing devices via the plurality of actuators; and
 providing a plurality of torque sensors, each torque sensor fixed to the actuator driveline adjacent one actuator, and configuring each torque sensor to sense torque values on the actuator driveline at each actuator;
 wherein when an aerodynamic load acting on one extended auxiliary lift wing device creates a higher static torque value at one actuator relative to other actuator torque values, a signal is generated by the flight computer to indicate a potential failure of at least one of the passive safety brakes.

Clause 18. The method of monitoring health of passive safety brakes in auxiliary lift aircraft wing devices of Clause 17, wherein the signal generates a caution message.

Clause 19. The method of monitoring health of passive safety brakes in auxiliary lift aircraft wing devices of Clause 17 or 18, wherein an in-flight monitor cycle includes measurement of static torque across left and right wing flap actuator drivelines to determine whether differences in static torque values exist among the actuators.

Clause 20. The method of monitoring health of passive safety brakes in auxiliary lift aircraft wing devices of any of Clauses 17-19, wherein a post-flight monitor cycle queries whether a caution message was sent during a previous flight.

What is claimed is:

1. An aircraft system, comprising:
 an aircraft wing having a plurality of auxiliary lift wing devices moveably attached to the aircraft wing between a retracted position and an extended position, the aircraft wing further including an actuator driveline;
 a plurality of actuators secured to the actuator driveline for deploying the auxiliary lift wing devices to the extended position, each of the actuators include at least one of a plurality of passive safety brakes, and each of the actuators is moveably connected to at least one of the auxiliary lift wing devices; and
 a plurality of torque sensors fixed to the actuator driveline adjacent to one of the respective actuators; each of the torque sensors are configured to sense torque values on the actuator driveline at each of the respective actuators when the auxiliary lift wing devices are statically fixed in the extended position during a flight of an aircraft;
 wherein an aerodynamic load acts on the auxiliary lift wing devices that are statically fixed in the extended position, and wherein a signal is generated by the aircraft system during the flight of the aircraft to indicate a potential failure of at least one of the passive safety brakes when a higher torque value is sensed at one of the actuators as compared to the torque values at the other one of the actuators while the aerodynamic load acts on the auxiliary lift wing devices in the extended position during the flight of the aircraft.

2. The aircraft system of claim 1, further comprising a flight computer that synchronously extends the auxiliary lift wing devices to the extended position via the actuators, and synchronously retracts the auxiliary lift wing devices to the retracted position via the plurality of actuators.

3. The aircraft system of claim 2, wherein when the signal is generated, the flight computer records the higher torque value, and generates a message to indicate the potential failure of the at least one of the passive safety brakes.

4. The aircraft system of claim 2, wherein the flight computer synchronously controls left and right wing flap actuator drivelines via a power drive unit (PDU).

5. The aircraft system of claim 4, wherein when an in-flight signal is generated, the flight computer also sends a message to a flight deck.

6. The aircraft system of claim 5, wherein the signal also indicates a potential failure of one of the torque sensors.

7. The aircraft system of claim 6, wherein the PDU is powered by redundant sources.

8. The aircraft system of claim 7, wherein one of the redundant sources is a hydraulic motor.

9. The aircraft system of claim 7, wherein one of the redundant sources is an electric motor.

10. An aircraft having a system for monitoring health of a plurality of passive safety brakes, the aircraft comprising:

an aircraft wing having a plurality of auxiliary lift wing devices moveably attached to the aircraft wing, the aircraft wing further including an actuator driveline;

a plurality of actuators secured to the actuator driveline for deploying the auxiliary lift wing devices, each of the actuators include at least one of the passive safety brakes, and each of the actuators are moveably connected to at least one of the auxiliary lift wing devices;

a flight computer for synchronously extending and retracting the plurality of auxiliary lift wing devices via the plurality of actuators, wherein the auxiliary lift wing devices are statically fixed when extended to an extended position; and a plurality of torque sensors each being fixed to the actuator driveline adjacent to respective ones of the actuators and each of the torque sensors are configured to sense torque values on the actuator driveline at each of the actuators when the auxiliary lift wing devices are statically fixed in the extended position during a flight of the aircraft;

wherein an aerodynamic load acts on the auxiliary lift wing devices that are statically fixed in the extended position, and wherein a signal is generated by the flight computer during the flight of the aircraft to indicate a potential failure of at least one of the passive safety brakes when a higher torque value is sensed at one of the actuators relative to the torque values at the other actuators while the aerodynamic load acts on the auxiliary lift wing devices in the extended position during the flight of the aircraft.

11. The aircraft of claim 10, wherein when the signal is generated, the flight computer records the higher torque value at the one of the actuators relative to the torque values at the other actuators, and triggers a message to indicate the potential failure of the at least one of the passive safety brakes.

12. The aircraft of claim 10, wherein the signal also indicates a potential failure of one of the torque sensors.

13. The aircraft of claim 10, wherein the flight computer controls left and right wing flap actuator drivelines synchronously via a power drive unit (PDU).

14. The aircraft of claim 13, wherein the PDU is powered by redundant sources.

15. The aircraft of claim 14, wherein one of the redundant sources is a hydraulic motor.

16. The aircraft of claim 14, wherein one of the redundant sources is an electric motor.

17. A method of monitoring health of a plurality of passive safety brakes, the method comprising:

providing an aircraft wing having an actuator driveline and a plurality of auxiliary lift wing devices, wherein the auxiliary lift wing devices are moveably attached to the aircraft wing;

securing a plurality of actuators to the actuator driveline for deploying the auxiliary lift wing devices, and connecting each of the actuators to at least one of the auxiliary lift wing devices, wherein each of the actuators include at least one of the passive safety brakes;

providing a flight computer for synchronously extending and retracting the plurality of auxiliary lift wing devices via the plurality of actuators; and fixing each of a plurality of torque sensors to the actuator driveline adjacent to respective ones of the actuators, wherein each of the torque sensors are configured to sense torque values on the actuator driveline at each of the actuators when the auxiliary lift wing devices are statically fixed in an extended position during a flight of an aircraft, wherein an aerodynamic load acts on the auxiliary lift wing devices that are statically fixed in the extended position;

generating a signal by the flight computer during the flight of the aircraft to indicate a potential failure of at least one of the passive safety brakes when a higher torque value is sensed at one of the actuators as compared to the torque values at the other actuators while the aerodynamic load acts on the auxiliary lift wing devices in the extended position during the flight of the aircraft.

18. The method of claim 17, wherein the signal generates a caution message.

19. The method of claim 17, wherein an in-flight monitor cycle includes measurement of static torque across left and right wing flap actuator drivelines to determine whether differences in static torque values exist among the actuators during the flight of the aircraft.

20. The method of claim 17, wherein a post-flight monitor cycle queries whether a caution message was sent during a previous flight.

* * * * *